US007560903B2

(12) United States Patent
Thrap

(10) Patent No.: US 7,560,903 B2
(45) Date of Patent: Jul. 14, 2009

(54) APPARATUS AND METHOD FOR DISCHARGING ELECTRICAL ENERGY STORAGE CELLS

(75) Inventor: Guy Thrap, Del Mar, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 298 days.

(21) Appl. No.: 11/117,230

(22) Filed: Apr. 28, 2005

(65) Prior Publication Data

US 2006/0244427 A1 Nov. 2, 2006

(51) Int. Cl.
*H02J 7/00* (2006.01)

(52) U.S. Cl. ...................................... 320/166; 320/167

(58) Field of Classification Search ................. 320/166, 320/167

See application file for complete search history.

(56) References Cited

U.S. PATENT DOCUMENTS 5,041,776 A * 8/1991 Shirata et al. ................. 322/29
5,260,637 A * 11/1993 Pizzi .......................... 320/103
5,572,108 A * 11/1996 Windes ...................... 320/167
5,652,499 A * 7/1997 Morita et al. ............... 320/112
2003/0169022 A1* 9/2003 Turner et al. ................ 320/166

* cited by examiner

*Primary Examiner*—Akm E Ullah
*Assistant Examiner*—Jue Zhang
(74) *Attorney, Agent, or Firm*—Oppedahl Patent Law Firm LLC

(57) ABSTRACT

A power module includes double layer capacitors, a voltage booster, a charging circuit, and a switching assembly. In discharging mode, the switching assembly connects the voltage booster to the output of the power module. The voltage booster enhances the voltage of the cells as needed for operation of a load at the output of the module. In charging mode, the switching assembly connects the charging circuit to the output of the module to receive electric energy from an external charger connected to the output of the module. The charging circuit converts the received energy into energy suitable for recharging the cells. In end-of-cycle discharging mode, the switching assembly connects the voltage booster to the charging circuit, causing these devices to loop into each other. Inefficiencies in the voltage booster and the charging circuit dissipate the energy in the cells, rendering the battery fail-safe.

15 Claims, 7 Drawing Sheets

APPARATUS AND METHOD FOR DISCHARGING ELECTRICAL ENERGY STORAGE CELLS

FIELD OF THE INVENTION

The present invention relates generally to electrical energy storage cells, and, in particular, to apparatus and methods for providing electrical energy storage devices with self-discharge capability to complete discharge cycles of the devices and render the devices fail-safe.

BACKGROUND

Electrical energy storage cells are widely used to provide power to electronic, electrical, electromechanical, electrochemical, and other useful devices. Such cells include primary chemical cells, secondary (rechargeable) chemical cells, fuel cells, and various species of capacitors. Important characteristics of electrical energy storage cells include energy density, power density, charging rate, internal leakage current, equivalent series resistance (ESR), and ability to withstand multiple charge-discharge cycles. For a number of reasons, double layer capacitors, also known as supercapacitors and ultracapacitors, are finding use in applications that traditionally have been filled by batteries. These reasons include availability of double layer capacitors with high power and energy density characteristics that respectively exceed and approach those of conventional battery technology. In other words, double layer capacitors are capable of delivering high instantaneous power levels, can be quickly recharged, and store substantially more energy per unit weight and unit volume than battery cells.

Different kinds of electrical energy storage devices generally have different profiles of voltage-versus-charge curves. Some chemical cells, for example, maintain a relatively flat (constant) voltage throughout their useful life, and then suffer a steep voltage drop with continuing discharge. In the case of some battery cells, discharge below a certain voltage level may cause permanent damage to the cells, with these types of cells generally being discharged below a predetermined voltage level during operation. In contrast, capacitor voltage decreases linearly with the charge drawn from the capacitor, according to the following well-known formula:

$$\frac{dV}{dt} = \frac{I}{C} = \frac{\frac{dq}{dt}}{C}.$$

In the above formula, $$\frac{dV}{dt}$$

is the time derivative of the capacitor voltage, I is the current flowing into the capacitor (so that a discharging capacitor corresponds to a negative I), C is the capacitance value of the capacitor, and $$\frac{dq}{dt}$$

is the time derivative of the charge stored in the capacitor.

Electrical devices are limited in their operation by the specified operating voltage range of their respective power sources. (Electrical devices or loads in the present context are defined broadly to include any device that uses electrical energy in the course of its operation, including, without limitation, electronic, electromechanical, electrochemical, and other devices.) As discussed, when discharged below some minimum voltage, battery cells may be damaged, which acts to limit the operating voltage range over which an electrical load device connected thereto can be operated. For example, in an automotive starter and battery application it is known that full discharge can destructively affect the starter battery. For this reason, automotive starter batteries are maintained in a state that is above a certain minimum voltage. Although operation below such a minimum voltage is can be avoided, it entails that the full range of energy available from the battery is cannot be utilized.

Double layer capacitors, on the other hand, can be repeatably discharged to zero volts without experiencing any damage. For this reason, use of double layer capacitors can enable the use of electrical load devices over a wider operating voltage range.

However, matching a double layer capacitor cell voltage profile to electrical load device requirements presents additional considerations. As has been mentioned, capacitor voltage decreases linearly with the charge drawn from the capacitor. Thus, even if an operating voltage range is broad enough so that the upper voltage limit is twice the lower voltage limit $$\left(V_{upper} = 2 * V_{lower} \text{ or } V_{lower} = \frac{V_{upper}}{2}\right),$$

twenty-five percent of the cell's energy will remain unused when the capacitor voltage drops to the level of the lower voltage limit. This statement can be verified from the formula relating the energy stored in the capacitor (E) to the capacitor's voltage (V) and capacitance value (C):

$$E = \frac{C * V^2}{2}.$$

Thus, capacitor energy remaining at the lower voltage limit ($E_{lower}$) can be expressed in terms of the capacitor energy at the upper voltage limit ($E_{upper}$) as follows:

$$E_{lower} = \frac{C * V_{lower}^2}{2} = \frac{C * \left(\frac{V_{upper}}{2}\right)^2}{2} = \frac{C * \left(\frac{V_{upper}^2}{4}\right)}{2} = 0.25 * \frac{C * V_{upper}^2}{2} = 0.25 * E_{upper}.$$

This energy value may be a significant, and generally constitutes a higher percentage of remaining energy than at a comparative battery voltage.

In many applications the energy remaining in a battery or capacitor cell presents a safety concern. For one example, the cell may need to be shipped for disposal, to a recharging facility, or elsewhere; or the cell or electrical load device connected thereto may need to be serviced. The cell may also be desired to be used and/or stored in an inherently dangerous environment, such as an oil platform, a mine, an explosives factory, or a fireworks factory. In these and other similar environments, the potential for arcing or sparking may present a high degree of risk to life and property. Indeed, the risk may be unacceptable. For example, in the oil platform environment, there is a requirement that there be no sources of arcs or sparks that could cause ignition of combustible gases and material. During certain scenarios, for example as during oil platform maintenance, this requirement dictates that all sources of energy be discharged to zero. The requirement for full discharge prevents the use of battery technology on oil platforms, which in turn, prevents oil platforms from using batteries as backup power sources, for example, as for power backup of computer systems during power failure. Consequently, when there is a power failure, one or more systems on an oil platform can be completely disabled.

Because of their ability to provide performance similar or better than battery cells, double layer capacitor cells have been used in the prior art for backup power. Unlike battery cells, double layer capacitor cells can be discharged to zero volts. However, the rate of such discharge is limited by a capacitors RC time constant as well as by the resistance of the discharge circuit. For example, when shorted using a 10 foot 4 gauge battery cable with an internal resistance of 4 milliohm, a 48 volt 400 Farad capacitor source with a 4 milliohm internal DC resistance comprises a circuit with an RC time constant of about 3.2 seconds. In practice, to limit discharge current to a lower level, a low resistance power resistor is used instead of battery cables. With increased resistance, there occurs increased discharge time to a "safe" level, which when attempted using a passive circuit comprising a passive 1 ohm high power value resistor can be on the order of many hours, if not days. Thus, because a "nearly depleted" double layer capacitor cell does not mean a "completely depleted" cell, to date, double layer capacitors have been limited to use in applications where long discharge times have not been a major safety issue.

Therefore, it would be desirable to provide one or more solution to the problems presented in the prior art.

SUMMARY

A need thus exists to provide methods and apparatus for rapid discharge of electric energy storage cells, and in particular of double layer capacitor cells. A need also exists for electric energy storage cells, including double layer capacitor cells, to be integrated with self-discharge mechanisms. With the present invention, rapid discharge of double layer capacitors enables their safe use in existing applications as well as previously unconsidered applications. As well, applications that previously could not be implemented, can now with the present invention be enabled. The definition of safe use can vary according to a particular application or environment the invention used in. In one embodiment, in a combustible environment, a safe use is when a voltage at a load connected to the invention is less than about 1 volt. Other safe voltages higher and lower than 1 volt are also within the scope of the invention.

In select embodiments, the present invention is directed to a power module that includes one or more electrical energy storage cells, and one or more active circuit that may be used for its own utility and/or to dissipate energy stored in the cells. In one embodiment, the one or more active circuit may comprise a voltage converter, a charging circuit, and/or a switch assembly.

The cell or cells may be double layer capacitor cells.

The voltage converter has an input and an output. The converter's input is coupled to the cells to receive the cells' voltage. The voltage converter is configured to convert the received voltage into a converted voltage at the output of the voltage converter. For example, the converter can boost the cells' voltage, transform DC voltage of the cells into alternating voltage, both boost and transform the cell's voltage, or perform some other voltage conversion.

The charging circuit also has an input and an output. The output of the charging circuit is coupled to the cells and to the input of the voltage converter. The charging circuit is configured to convert electrical voltage at its input into charging circuit output voltage for charging the cells, which are connected to the output of the charging circuit. In some embodiments, the charging circuit is a DC-to-DC constant power circuit capable of increasing current at the output of the charging circuit in response to a decrease of voltage level of the one or more cells. In other embodiments, the charging circuit is an AC-to-DC charging voltage converter.

The switch assembly is connected to the input of the charging circuit and to the output of the voltage converter. The switch assembly can be configured to couple selectively the output of the voltage converter to the input of the charging circuit. When the switch assembly is so configured, the voltage converter and the charging circuit loop into each other, i.e., the converter generates a voltage that drives the charging circuit, while the charging circuit generates the voltage that drives the voltage converter. In this configuration, the power losses in the voltage converter and in the charging circuit dissipate the energy in the cells.

In some embodiments, the switch assembly is implemented as one or more solid-state devices. In some embodiments, the switch assembly is implemented as a distributed mechanism that selectively enables and disables the voltage converter and the charging circuit depending on the voltage of the energy storage cells and the voltage at the output of the power module.

In one embodiment, a method for discharging one or more energy storage cells comprises providing a voltage converter comprising an input and an output, the voltage converter being configured to convert voltage of the one or more cells at the input of the voltage converter into a converted voltage at the output of the voltage converter; providing a charging circuit comprising an input and an output, the charging circuit being configured to convert electrical voltage at the input of the charging circuit into charging circuit output voltage for charging the one or more cells at the output of the charging circuit; coupling the input of the voltage converter to the output of the charging circuit and to the one or more cells; and coupling the output of the voltage converter to the input of the charging circuit; whereby power losses in the voltage converter and in the charging circuit dissipate energy in the one or more cells.

In one embodiment a power module for use with one or more electrical energy storage cells, comprises: a voltage converter comprising an input and an output, the input of the voltage converter being coupled to the one or more cells to receive voltage of the one or more cells, the voltage converter being configured to convert the voltage at the input of the voltage converter into a converted voltage at the output of the voltage converter; a charging circuit comprising an input and an output, the output of the charging circuit being coupled to the one or more energy storage cells and to the input of the voltage converter, the charging circuit being configured to convert electrical voltage at the input of the charging circuit into charging circuit output voltage for charging the one or more cells at the output of the charging circuit; and a switching assembly connected to the input of the charging circuit and to the output of the voltage converter, the switching assembly being capable of selectively coupling the output of the voltage converter to the input of the charging circuit; wherein, when the switching assembly couples the output of the voltage converter to the input of the charging circuit, the power losses in the voltage converter and in the charging circuit dissipate energy in the one or more cells. In one embodiment, the one or more cells comprise at least one double layer capacitor. The switching assembly may comprise a plurality of solid-state switches. The voltage converter may comprise a DC-to-DC voltage booster. The power module may further comprise a housekeeping power supply coupled to the output of the DC-to-DC voltage booster. The charging circuit may comprise a DC-to-DC constant power circuit capable of increasing current at the output of the charging circuit in response to decrease of voltage of the one or more cells. The voltage converter may comprise a DC-to-DC voltage converter with interleaved operation. The charging circuit may comprise a DC-to-DC constant power circuit with interleaved operation. In one embodiment, the charging circuit may comprise an AC-to-DC charging voltage converter; and the voltage converter may comprise a DC-to-AC voltage booster. In one embodiment, the power module may further comprise a switch controller coupled to the switching assembly for controlling state of the switching assembly. The switching assembly may comprise a distributed mechanism that selectively enables and disables the voltage booster and the charger.

In one embodiment, a method for discharging one or more electrical energy storage cells, the method comprises connecting the one or more cells to a voltage booster and to a charging circuit; and connecting an output of the voltage booster to an input of the charging circuit so that the voltage booster and the charging circuit loop into each other dissipating energy stored in the one or more cells. The one or more energy storage cells may comprise one or more double layer capacitors.

In one embodiment one or more energy dissipation circuit is coupled to one or more energy storage capacitor to actively dissipate energy stored in the one or more energy storage capacitor. In one embodiment, an energy dissipation circuit comprises a voltage converter circuit. In one embodiment, an energy dissipation circuit comprises a charging circuit. In one embodiment, an energy dissipation circuit comprises a switch controller. In one embodiment, the one or more energy dissipation circuit comprises a voltage converter, a charging circuit, and a switching assembly for selectively coupling the output of the voltage converter to the input of the charging circuit power, and wherein losses in the voltage converter and in the charging circuit can be used dissipate the energy in the one or more energy storage capacitor. In one embodiment, the one or more energy dissipation circuit is coupled to a load, wherein the energy dissipation circuit is capable of dissipating the energy such that a voltage at the load is lowered to a safe level relative to the environment the system is disposed in. In one embodiment, the safe level is a voltage that is less than about 1 volt. In one embodiment, the one or more capacitor comprises one or more double-layer capacitor, wherein when the double layer capacitor comprises a 48 volt 400 Farad capacitor, the one or more energy dissipation circuit is capable of discharging the capacitor in less than one hour.

These and other features and aspects of the present invention will be better understood with reference to the following description, drawings, and appended claims.

SPECIFICATION

Figure 1:
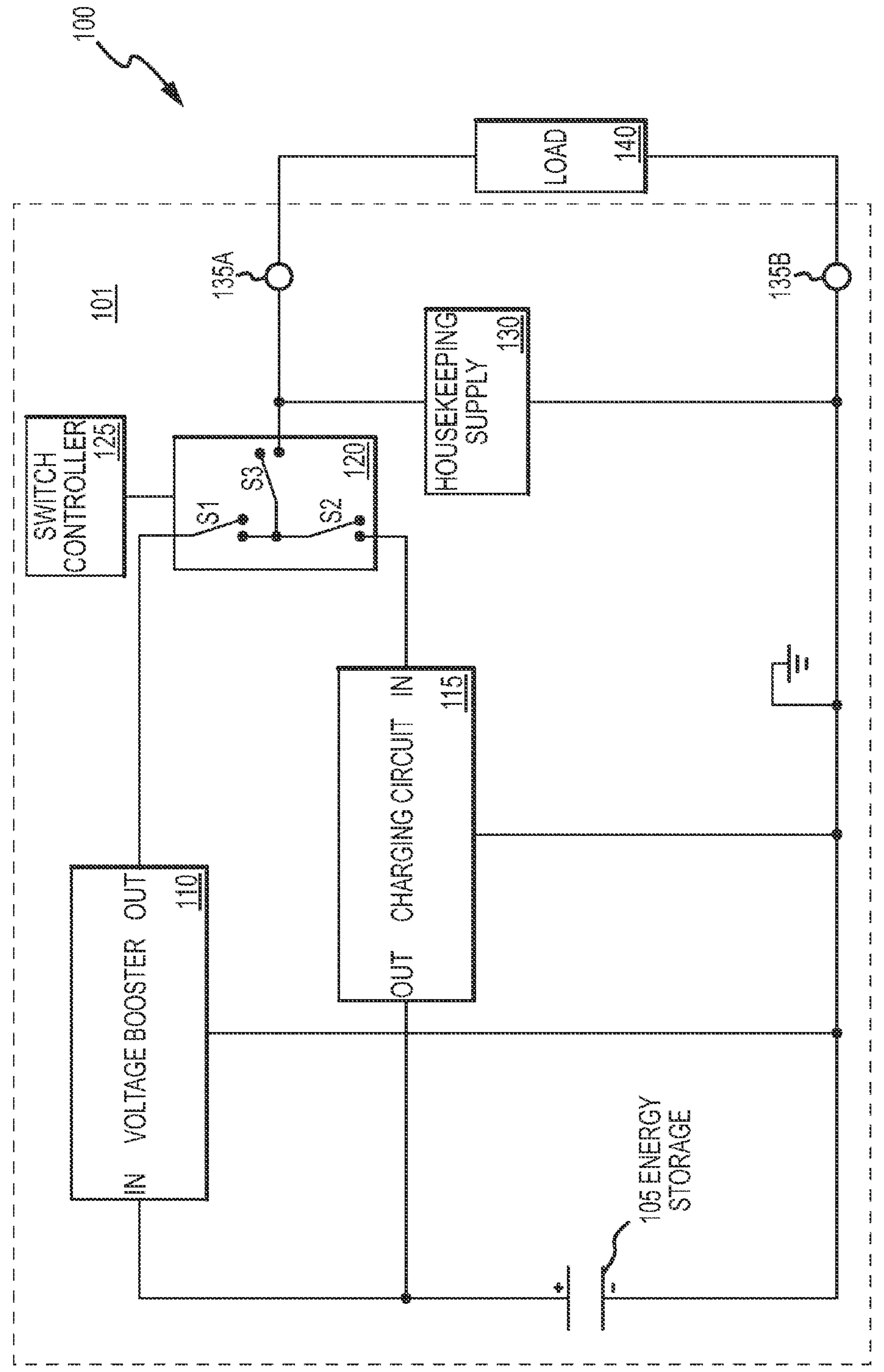
FIG. 1 illustrates selected elements of a combination of a power module and a load powered by the power module, in accordance with an embodiment of the present invention.

Reference will now be made in detail to several embodiments of the invention that are illustrated in the accompanying drawings. Same reference numerals may be used in the drawings and the description to refer to the same or like parts or steps. The drawings are in simplified form and not to precise scale. For purposes of convenience and clarity only, directional terms, such as top, bottom, left, right, up, down, over, above, below, beneath, rear, and front may be used with respect to the accompanying drawings. These and similar directional terms should not be construed to limit the scope of the invention in any manner.

The words "embodiment" and "variant" refer to particular apparatus or process, and not necessarily to the same apparatus or process. Thus, "one embodiment" (or a similar expression) used in one place or context can refer to a particular apparatus or process; the same or a similar expression in a different place can refer to a different or the same apparatus or process. Similarly, "some embodiments," "certain embodiments," or similar expressions used in one place or context can refer to one or more particular apparatus or process; the same or similar expressions in a different place or context can refer to different or the same apparatus or process. The expression "alternative embodiment" and similar phrases are used to indicate one of a number of different possible embodiments. The number of potential embodiments is not necessarily limited to two or any other quantity. The words "couple," "connect," and similar terms with their inflectional morphemes are used interchangeably, unless the difference is noted or otherwise made clear from the context. These words and expressions do not necessarily signify direct connections, but include connections through mediate components and devices.

Other and further definitions and clarifications of definitions may be found throughout this document.

FIG. 1 is a high-level illustration of a combination 100 of a power module 101 and a load 140 powered by the module 101, in accordance with aspects of the present invention. The power module 101 includes one or more electric energy storage cell 105. In one embodiment, the cell or cells utilize double layer capacitor technology, which is known to those skilled in the art. If multiple cells 105 are included, the cells 105 may be arranged in series to increase the voltage available from the cells 105. The cells 105 may also be arranged in parallel, to increase current capacity of the power module 101. The cells 105 may also be arranged both in series and in parallel. For example, the cells 105 may include two or more banks of serially connected double layer capacitors; the banks in turn may be connected in parallel with each other.

One or more voltage balancing circuits may be connected to the serially arranged double layer capacitors to maintain voltage balance across the different cells. Voltage balancers for double layer capacitors are described, for example, in commonly-assigned U.S. Pat. No. 6,006,686, U.S. patent application Ser. No. 10/948,892; and in a commonly-assigned U.S. patent application Ser. No. 10/860,965. Each of these patent applications is hereby incorporated by reference in its entirety, including all figures, tables, and claims.

As FIG. 1 illustrates, the electrical energy storage cells 105 are coupled to a voltage booster 110. The voltage booster 110 is a DC-to-DC voltage converter that can raise or "boost" the voltage available from the cells 105. Various voltage boosters and other voltage converters are known in the art.

For example, the voltage booster 110 may operate according to the following scheme. Current is allowed to build up through an inductor connected in series with a switch. Periodically, the current flow is interrupted when the switch is opened. Because the current through the inductor does not change instantaneously, the inductor "pushes" the current through a rectifier into a higher voltage circuit. The switch is then closed again, allowing the current through the inductor to rebuild. When the switch is closed, the rectifier prevents the current to flow back from the higher voltage circuit. Opening and closing of the switch is performed periodically, with a frequency and duty cycle sufficient to maintain a desired voltage at the output of the voltage booster for a given load. A filter at the output of the booster smoothes the voltage pulses created by opening and closing the switch.

Commonly-assigned U.S. patent application Ser. No. 10/876,441, describes similar voltage boosters that can be used in the present invention. This patent application is hereby incorporated by reference in its entirety, including all figures, tables, and claims.

Returning now to FIG. 1, the electrical energy storage cells 105 are also coupled to a charging circuit 115. In certain embodiments, the charging circuit 115 is a step-down switching converter, such as a buck converter. Advantageously, in certain embodiments the charging circuit 115 is implemented as a constant power charger. Constant power charging is described in commonly-assigned U.S. patent application Ser. No. 10/611,420. This patent application is hereby incorporated by reference in its entirety, including all figures, tables, and claims.

Reference numeral 120 designates a switching assembly. As illustrated in FIG. 1, the switching assembly 120 is connected to the voltage booster 110, charging circuit 115, and a non-grounded output terminal 135A of the power module 101. In some embodiments, the switching assembly 120 is a solid state switching circuit that can switch currents and voltages used in the operation of the power module 101. In certain other embodiments, it includes one or more mechanical switches.

The state of the switching assembly 120 is controlled by a switch controller 125. The switch controller 125 may be, for example, a manual dial with different positions corresponding to different states of the switch assembly 120. The switch controller 125 may also be an electronic interface configured to accept remote commands and setting the state of the switch assembly 120 in accordance with the remote commands.

As will be illustrated below with reference to the system of FIGS. 2 through 6, in some embodiments the switch controller 125 and the switching assembly 120 are provided in the form of a distributed mechanism that selectively enables and disables the voltage booster and the charger depending on the voltage of the energy storage cells and the voltage at the output of the power module.

A housekeeping power supply 130 provides electrical current for operation of components such as a cooling fan and front panel indicator lights, e.g., light emitting diodes (LEDs). The housekeeping power supply 130 is coupled across the terminals 135A and 135B.

A load 140 is also connected across the terminals 135A and 135B of the power module 101, so that the module 101 provides electrical energy for operation of the load 140. Load 140 can be powered by module 101 or by an external energy source (not shown), in which case it will be identified that either module 101 or the external energy source could be used as either a primary or backup power source to the load 140.

The power module 101 has three operational modes: (1) a discharging mode, (2) a charging mode, and (3) a discharging mode. The three modes are described in order below.

In the discharging mode, the switch controller 125 configures the switching assembly 120 so that the voltage booster 110 is connected to the output terminal 135A, and the charging circuit 115 is not connected to the terminal 135A. (In some alternative embodiments, the voltage booster may be by-passed if the voltage of the energy storage cells is sufficient to power the load.) The switches S1 and S3 are now closed, and the switch S2 is open. In this configuration, the voltage booster 110 steps-up (if needed) the voltage of the cells 105 to the specified level, such as the voltage level required by the load 140. The load 140 can now be powered by the power module 101 through the terminals 135A and 135B.

In the charging mode, the switch controller 125 configures the switching assembly 120 so that the charging circuit 115 is connected to the output terminal 135A, and the voltage booster 110 is not connected to the terminal 135A. In other words, the switch S1 of the switching assembly 120 is opened, and the switches S2 and S3 are closed. Note that in this state the load 140 would likely be replaced or configured in parallel with an external source of electrical energy for charging the cells 105. In this configuration, the external source powers the charging circuit 115 via the switching assembly 120. The charging circuit 115 in turn recharges the electrical energy storage cells 105.

In the end-of-cycle discharging mode, the switch controller 125 configures the switching assembly 120 so that the voltage booster 110 is connected across the charging circuit 115. The switches S1 and S2 are both closed. In some embodiments, the switch S3 is also closed, and the load may (but need not) be connected to the terminals 135A and 135B.

When the power module 101 is in the end-of-cycle discharging mode, it operates as follows. The voltage booster 110 steps-up the voltage of the cells 105 so that the voltage at the input of the charging circuit 115 is sufficient to sustain operation of the charging circuit 115. The charging circuit 115 in turn provides power to the voltage booster 110. The voltage booster 110 and the charging circuit 115 thus loop into each other.

Note that the cells 105 may be discharged to a degree that would not allow the voltage booster to power the load 140 in the course of normal operation. But even in such discharged state, the voltage output by the booster 110 may be sufficient to operate the charging circuit 115.

Efficiency of the booster 110 and of the charging circuit 115 being less than 100%, power losses in these devices will be drawn from the cells 105, further discharging the cells. The booster 110 can be sized to power the load 140. Similarly, the charging circuit 115 can recharge the cells 105. Particularly in applications that employ double layer capacitors in the cells 105, the circuit 115 is likely to be capable of handling high power. Thus, the booster 110 and the charging circuit 115 may be sized so as to operate at high power levels, providing a relatively fast end-of-cycle discharge of the cells 105.

The rate of the discharging process may be increased still further if the switch S3 is also closed, or the voltage at the output of the booster 110 is otherwise allowed to drive the housekeeping power supply 130 and/or the load 140.

The power module 101 may be implemented as a rack-mountable package.

FIGS. 2 through 6 illustrate a voltage booster and a constant power charger for a power module in accordance with an embodiment of the present invention. A brief description of the operation of the system of FIGS. 2-6 is provided below for general guidance. Not every component or operational detail is described, but a person skilled in the art, using this description and the Figures, would be able to understand the relevant particulars of operation.

In FIGS. 2-6, reference characters NEG-CAP and POS-CAP designate connections to the negative and positive outputs, respectively, of a double layer capacitor bank. Electrically, all points designated with NEG-CAP are the same, as are all points designated with POS-CAP. (Note that in this embodiment NEG-CAP is electrical ground.) Similarly, all points designated with +VOUT are also the same in the electrical sense. Reference characters J1 and J2 designate, respectively, positive and negative output terminals of the circuit. These terminals are typically connected to the customer load or to a charger; they are similar to the terminals 135A and 135B of the power module 101 of FIG. 1.

Figure 2:
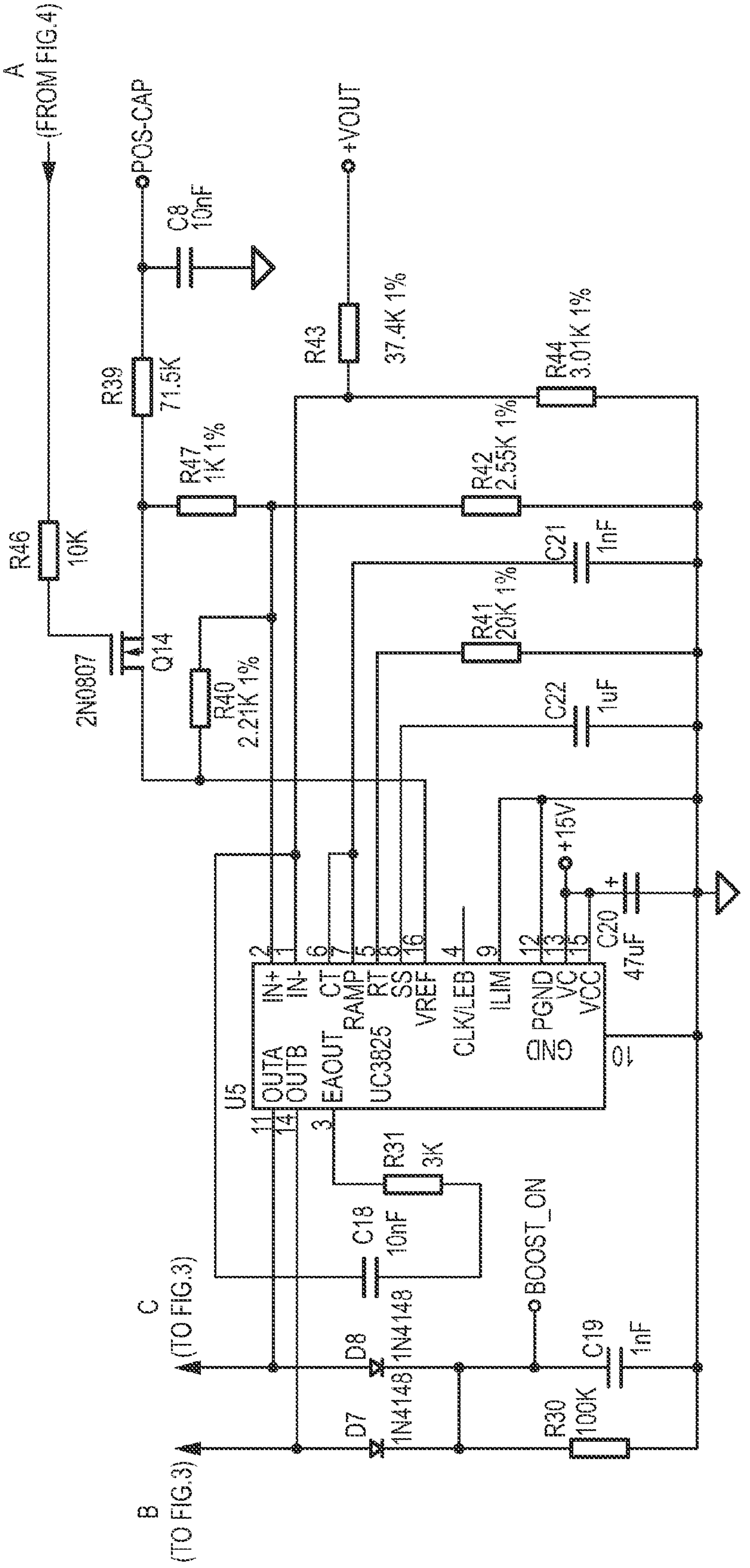
FIGS. 2 through 6 illustrate selected elements of a voltage booster and a constant power charger circuits of a power module, in accordance with an embodiment of the present invention.

FIG. 2 shows, among other components, a slope regulator circuit built around a pulse-width modulator (PWM) integrated circuit U5. When the slope regulator circuit is enabled, the pulse-width modulator U5 generates pulses at points B and C. The PWM U5 varies the width of the pulses output at the points B and C in response to the +VOUT voltage: the lower the voltage, the longer the pulses. As will be seen from the discussion below, the width (duty cycle) of the pulses is directly related to the voltage boost provided by the system shown in FIGS. 2-6. Thus, the circuit attempts to hold the +VOUT voltage at a relatively constant level, which is about 46 volts given the components shown in FIGS. 2-6. The signal at the point A is received from circuitry shown in FIG. 4, and will be described in relation to that Figure.

Figure 3:
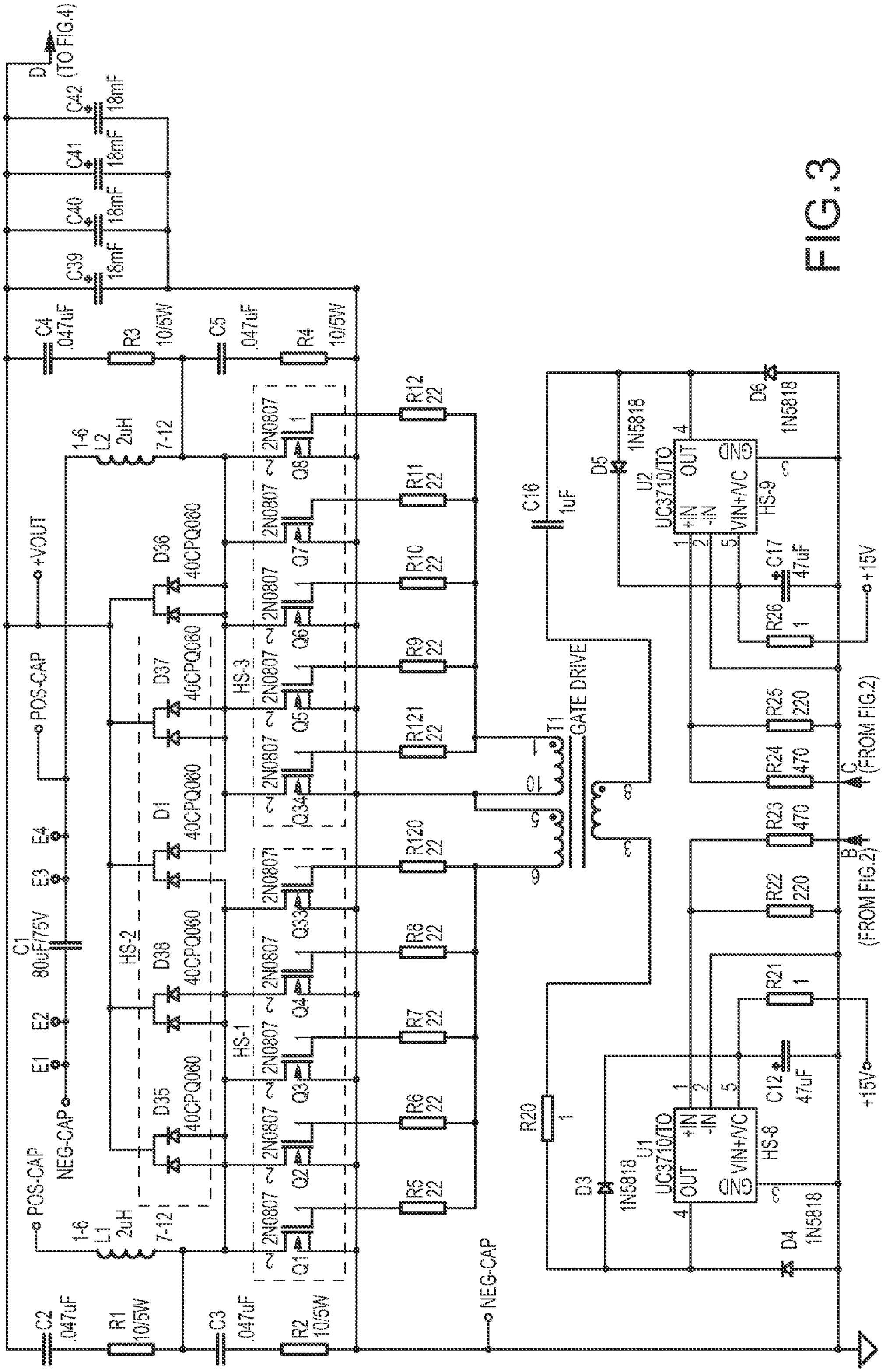

Turning now to FIG. 3, the pulses received from points B and C drive inputs of integrated circuits U1 and U2. The integrated circuits U1 and U2 are high current drivers that drive the primary windings of an isolation transformer T1. Two sets of secondary windings are present in the transformer T1. One set of the secondary windings drives a first bank of switching field effect transistors (FETs) that includes Q1, Q2, Q3, Q4, and Q33; a second set of the secondary windings drives a second bank of switching FETs that includes Q5, Q6, Q7, Q8, and Q34.

When the first FET bank is conducting, current builds up through an inductor L1. When the first FET bank stops conducting, the voltage across the inductor L1 increases to push the current through diodes D1 and D35-D38 into the terminal +VOUT, i.e., into capacitors C39-C42. The voltage at the terminal +VOUT thus increases above the potential difference available from the double layer capacitor cells that are connected between the terminals POS-CAP and NEG-CAP.

The operation of the second FET bank and an inductor L2 is similar to that of the first FET bank and the inductor L1. The second FET bank and its related components thus enhance, through interleaved operation, the current handling capacity of the voltage booster.

Figure 4:
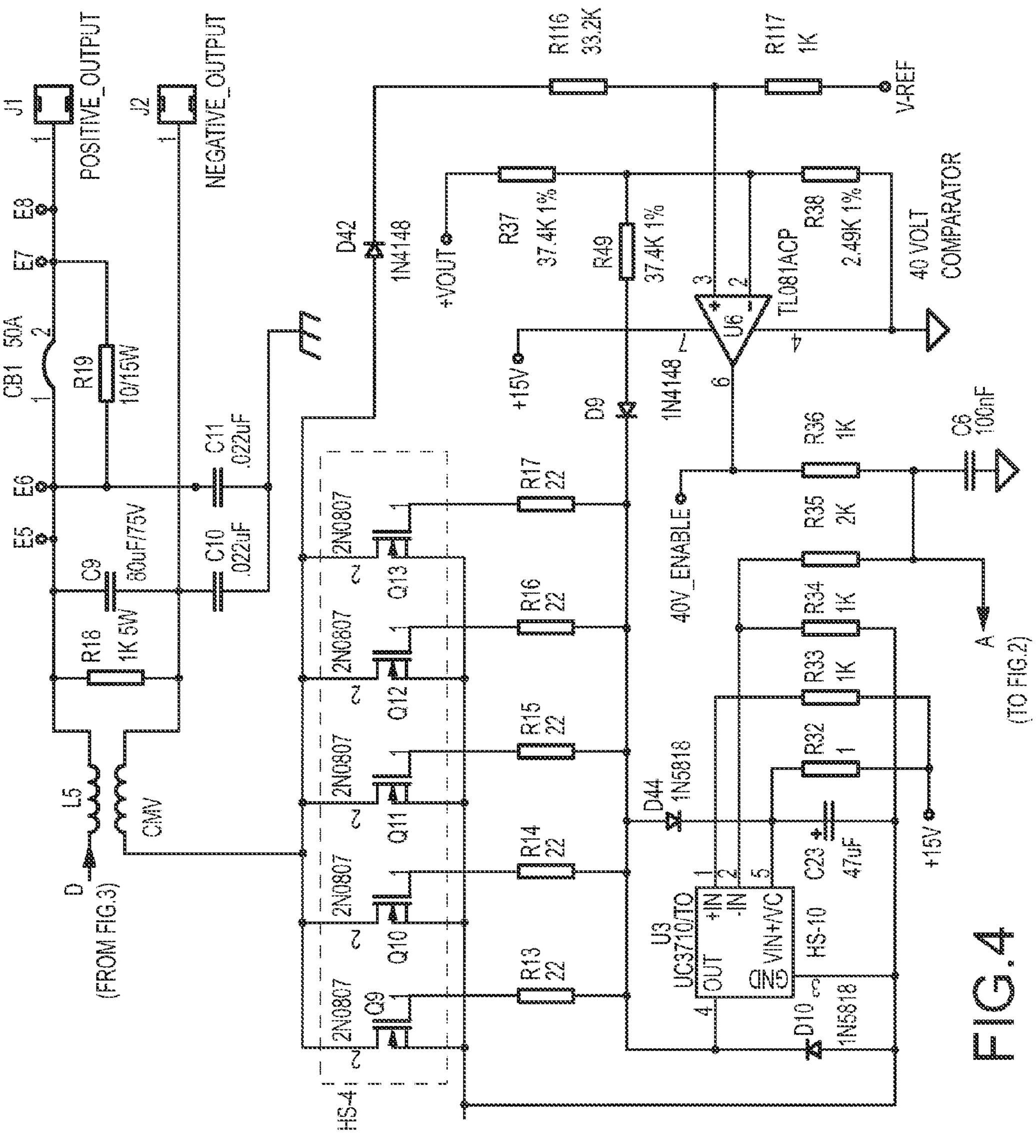

Filtering of the +VOUT voltage is provided by a filter, shown in FIG. 4, that includes a common mode inductor L5 resistors R18 and R19, and capacitors C9-C11. The boosted and filtered voltage is available at the output terminals J1 and J2.

FIG. 4 further shows a circuit for generating a 40V_ENABLE signal that drives, through a resistor R36, the slope regulator enable signal at the point A of FIG. 2. The 40V_ENABLE signal is generated at the output of a voltage comparator U6. The non-inverting input of the voltage comparator U6 is biased through a resistor R117 by a reference voltage V-REF. A voltage divider formed by resistors R37 and R38 and driven by the +VOUT voltage determines the voltage applied to the inverting input of the voltage comparator U6. In this circuit, R37, R38, and V-REF are selected so that the 40V_ENABLE signal is driven to a high level when the +VOUT voltage falls below approximately 40 volts.

Figure 5:
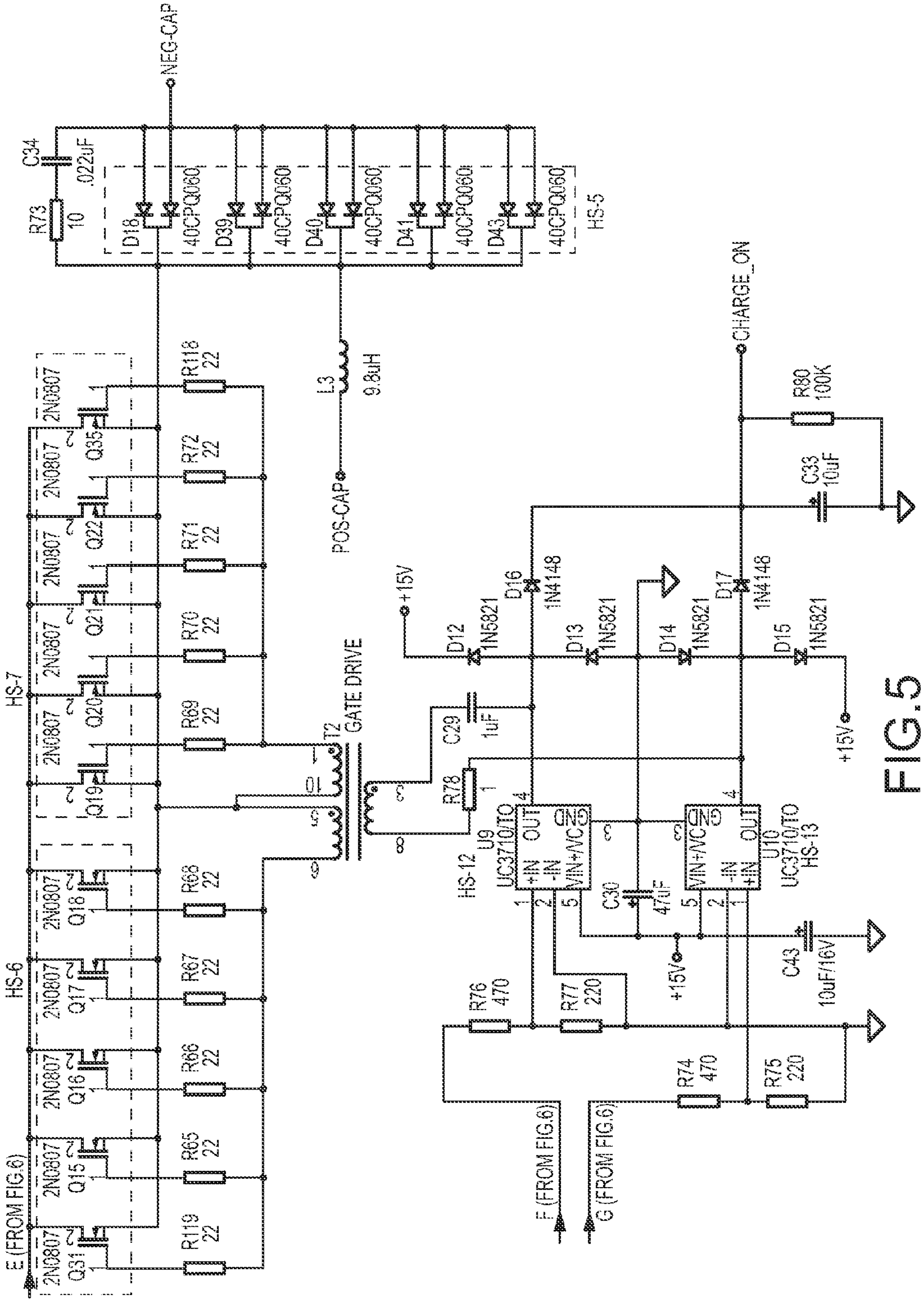
Figure 6:
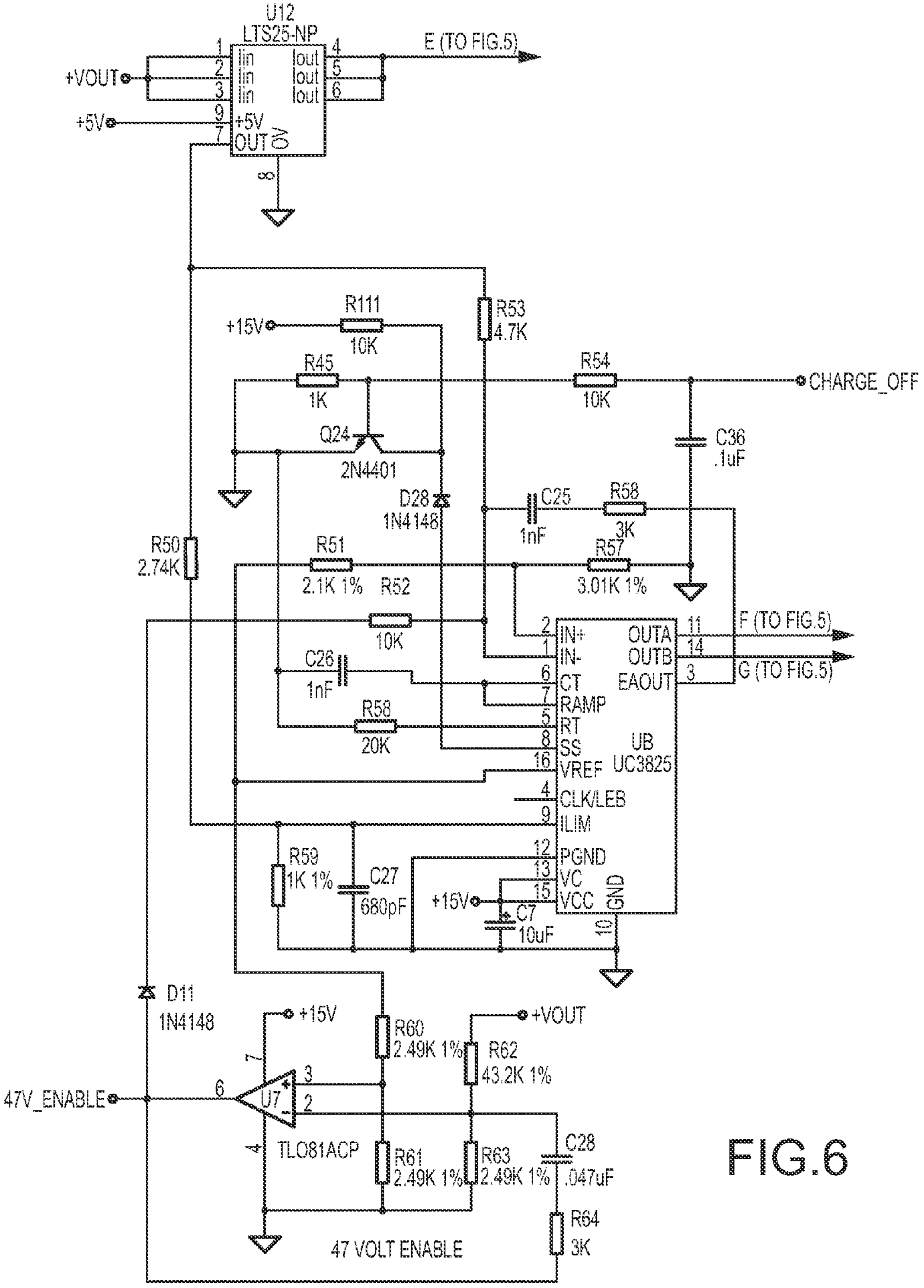

FIGS. 5 and 6 show components of a circuit for charging the double layer capacitors connected between the NEG-CAP and the POS-CAP terminals. A PWM circuit is built around an integrated circuit U8. This PWM circuit is enabled when two conditions are satisfied. First, the 47V_ENABLE signal at the output of a voltage comparator U7 is low, indicating that the +VOUT voltage is above about 47 volts. Second, the CHARGE_OFF signal is low, indicating that the double layer capacitor output voltage (POS-CAP voltage) is less than the +VOUT voltage by at least some small margin, e.g., 0.5 volts. When the PWM circuit of FIGS. 5 and 6 is enabled, the pulse-width modulator U8 generates pulses at its outputs (OUTA and OUTB).

The first of the two conditions is monitored by a circuit that includes the voltage comparator U7 and resistors R60 through R63. Given the voltage reference signal VREF of 5.1 volts (output by the PWM U8), the values of the resistors R60-R63 are such that the 47V_ENABLE signal transitions to a low voltage state when +VOUT exceeds about 47 volts. Generally, this occurs when an external charger is connected to the terminals J1 and J2, or when the system of FIGS. 2-6 enters the end-of-cycle discharge mode, as will be explained below.

The second condition is monitored by another voltage comparator (not shown) that monitors both the +VOUT and the POS-CAP voltages.

The pulses at the U8 outputs OUTA and OUTB drive inputs of U9 and U10, which are high current drivers that drive the primary windings of a transformer T2. Two sets of secondary windings are present in the transformer T2. The first set of the secondary windings of T2 drives a bank of switching FETs that includes Q15, Q16, Q17, Q18, and Q31; the second set of the secondary windings of T2 drives another bank of switching FETs that includes Q19, Q20, Q21, Q22, and Q35. These FET banks conduct current in an interleaved manner. The current flows through a hall-effect current sensor U12, diodes D18, D39-D41, and D43, and an inductor L3 into the POS-CAP terminal, thereby charging the double layer capacitors.

The amount of the charging current received by the capacitors increases with two variables: (1) the widths of the pulses, and (2) the potential difference between the +VOUT and POS-CAP points. Focusing on the second of these variables, the voltage at the +VOUT point is substantially the same as the voltage of the charger connected to the terminals J1 and J2; the POS-CAP voltage is the voltage of the double layer capacitors between the POS-CAP and NEG-CAP terminals.

Thus, the amount of the charging current increases when the POS-CAP voltage is low, allowing a faster initial ramp-up during the charging process.

The hall-effect current sensor U12 senses the current flowing into the double layer capacitors. When the current exceeds a preset value, the voltage output by the current sensor U12 increases so as to cause the PWM U8 to stop generating the pulses at its OUTA and OUTB outputs. This prevents certain failures in the double layer capacitors or the charging circuit from disabling the external charger and external circuitry driven by the external charger.

From a high level perspective, the system of FIGS. 2-6 enters the end-of-cycle discharge mode as follows. Initially, the double layer capacitors between the POS-CAP and NEG-CAP terminals are fully charged to about 55 volts. The charging circuits (FIGS. 5 and 6) are not enabled, because the POS-CAP voltage about the same as the +VOUT voltage, causing the CHARGE_OFF signal to be high. As the system of FIGS. 2-6 is called upon to provide power stored in the double layer capacitors, the double layer capacitors discharge, lowering the POS-CAP voltage. The booster circuit (FIGS. 2-4) remains inactive until the +VOUT voltage drops to about 46 volts. When the double layer capacitors discharge far enough for the +VOUT voltage to drop to about 46 volts, the booster circuit begins to enhance the +VOUT voltage, maintaining it at that level.

Eventually, the double layer capacitors discharge to a level where the booster circuit is unable to drive the customer load at the J1/J2 terminals with 46 volts. The +VOUT voltage then begins to drop below 46 volts. The charging circuits remain disabled because the 47V_ENABLE signal is now high. The double layer capacitors will continue to discharge, and at some point the +VOUT voltage will drop to about 40 volts, where the system of FIGS. 2-6 may not be able to provide the specified voltage to the customer load. The voltage comparator U6 detects this condition and causes the 40V_ENABLE signal to transition high, turning off the switching FETs Q9 through Q13, thereby disconnecting the customer load at the J1/J2 terminals. The voltage at the J2 terminal, which is now disconnected from the ground, drifts higher, forward-biasing a diode D42 (through common mode inductor L5), and increasing the biasing voltage at the non-inverting input of the voltage comparator U6. Consequently, the 40V_ENABLE signal is latched in the high state.

When the 40V_ENABLE signal is in the high state, it also changes the mode of operation of the PWM U5, increasing the voltage boost provided by the booster circuit. In this mode, given the absence of a need to power the customer load, the booster circuit drives the +VOUT voltage to about 55 volts. Recall that the 40V_ENABLE signal has been latched and does not change even when the +VOUT voltage goes to 55 volts. Thus, the voltage booster continues to operate in this enhanced mode.

With the +VOUT voltage at 55 volts, the 47V_ENABLE signal is once again low. At the same time, the POS-CAP voltage is also low, because the double layer capacitors are discharged and their output voltage is substantially less than the +VOUT voltage. Both conditions for the operation of the charging circuits of FIGS. 5 and 6 are satisfied, and the charging circuits are enabled. The booster circuit and the charging circuits are thus looping into each other, dissipating the electrical energy remaining in the double layer capacitors. This continues until the voltage of the double layer capacitors decreases so far that the booster circuit is unable to maintain the +VOUT voltage above 47 volts. The charging circuits will then intermittently turn on and off, and eventually remain in the off state. At this point, the double layer capacitors will likely have been rendered fail-safe, with their output voltage reaching about 1 volt in certain embodiments, with 1 volt being identified as a safe voltage at which arcing across terminals is minimized to level that many combustible processes cannot be initiated. Those skilled in the art would understand that other voltages in other applications could be considered a "safe" voltage, for example, above or below 1 volt.

In one embodiment, a 48 volt 400 Farad capacitor source may be discharged to a level of about 1 volt in about less than about one hour. In one embodiment, wherein a 48 volt 400 Farad capacitor source with a 4 milliohm internal DC resistance is connected across the NEG-CAP and the POS-CAP terminals, the capacitor source may be discharged to a level of about 1 volt in about less than 2 minutes.

When an external charger is connected to the J1/J2 terminals, the voltage at the J2 terminal will again become low, unlatching the 40V_ENABLE signal. The Q9-Q13 switches will open, and the booster circuit will be substantially inactive because the +VOUT voltage will again be high. The charging circuits will continue to operate, because (1) the 47V_ENABLE signal will be low (+VOUT>47 volts), and (2) the CHARGE_OFF signal will be low (double layer capacitor voltage POS-CAP<+VOUT). The double layer capacitors will therefore be charged.

Figure 7:
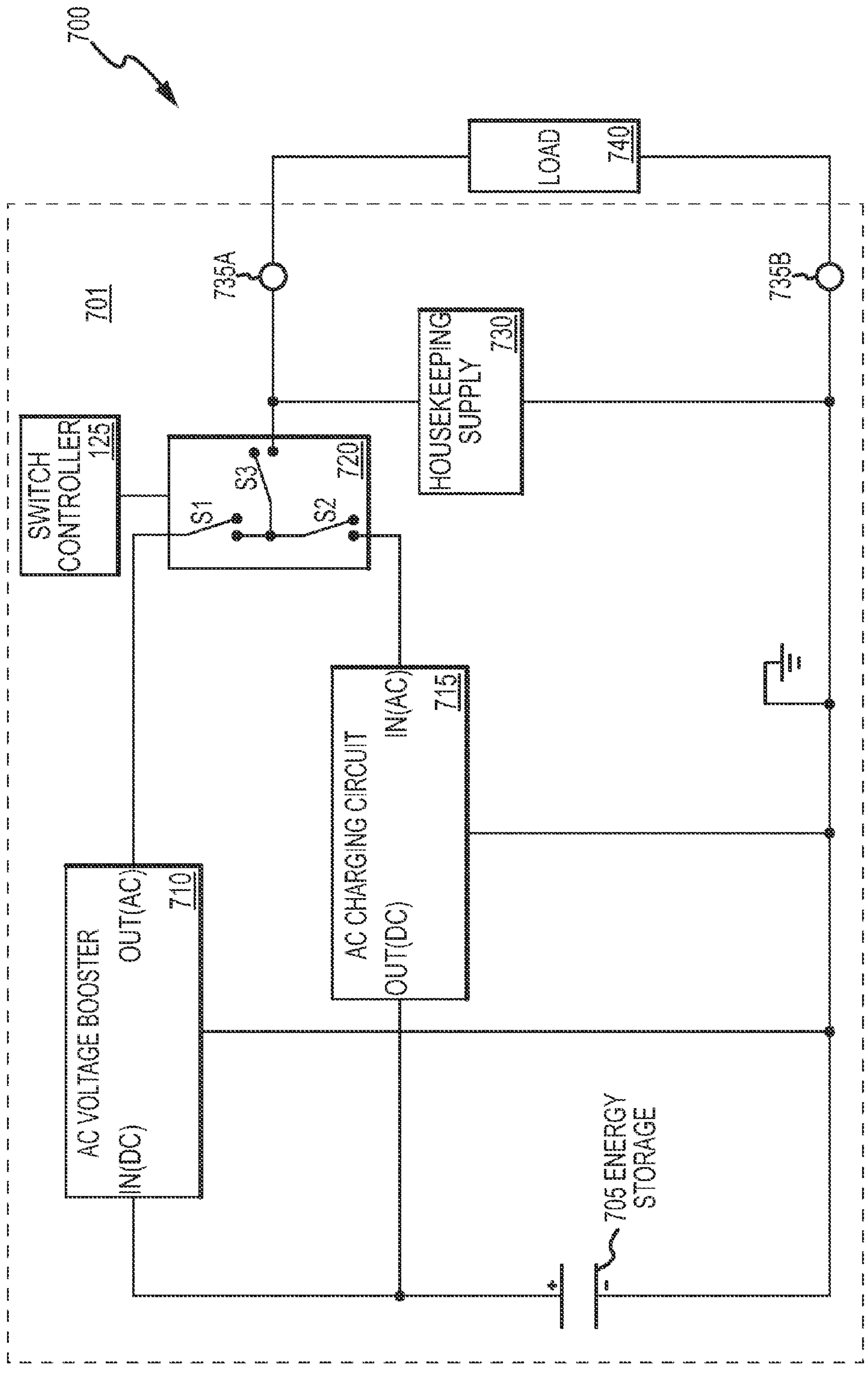
FIG. 7 illustrates selected elements of a combination of a power module and an alternating current (AC) load powered by the power module, in accordance with an embodiment of the present invention.

So far this document has given examples of the voltage booster (e.g., booster 110 of FIG. 1) and the charging circuit (e.g., circuit 115 of FIG. 1) as DC-to-DC converters. More generally, however, these components need not be limited solely to DC-to-DC converters. FIG. 7 is a high-level illustration of a combination 700 of a power module 701 and a load 740 powered by the module 701, where the voltage output by the power module 701 is alternating voltage.

The power module 701 includes one or more electric energy storage cells 705, for example, double layer capacitor cells. The cells 705 may be connected in parallel, in series, and in various ways that include both series and parallel combinations (similarly to the arrangements of cells described above in relation to FIG. 1.) One or more voltage balancing circuits may be connected to the serially arranged cells to maintain voltage balance across different cells connected in series.

The electrical energy storage cells 705 are connected in series with a voltage converter 710. Here, the voltage converter 710 is a DC-to-AC converter that can convert the voltage available from the cells 705 into an alternating voltage. The alternating voltage may be higher than the DC voltage provided by the cells 705. Various DC-to-AC voltage converters are known in the art. For example, the DC-to-AC converter may include an oscillator circuit powered by the DC voltage. A transformer may step up the alternating voltage output by the oscillator.

The electrical energy storage cells 705 are also connected in series with a charging circuit 715. The circuit 715 is an AC-to-DC converter. In certain embodiments, the charging circuit 715 includes a step-down transformer followed by a rectifier and a low-pass filter.

A switching assembly 720 may be similar to the switching assembly 120 of the power module 101 of FIG. 1. It is connected to the voltage converter 710, the charging circuit 715, and an output terminal 735A. The state of the switching assembly 720 is controlled by a switch controller 725. The switch controller 725 may be, for example, a manual dial with different positions corresponding to different states of the switching assembly 720. The switch controller 725 may also be an electronic interface configured to accept remote commands and setting the state of the switching assembly 720 in accordance with the remote commands.

A housekeeping power supply 730 provides electrical current for operation of components such as a cooling fan and front panel indicator lights. A load 740 is connected across the terminals 735A and 735B, to receive electrical energy for its operation from the power module 701.

The power module 701 has the same three operational modes as the power module 101, i.e., a discharging mode, a charging mode, and an end-of-cycle discharging mode. In the discharging mode, the switching assembly 720 connects the voltage converter 710 to the output terminal 735A, and leaves the charging circuit 715 disconnected from this terminal. In this configuration, the voltage converter 710 steps-up the voltage of the cells 705 to the specified level and converts the voltage to an alternating voltage, such as the voltage required by the load 740.

In the charging mode, the switching assembly 720 connects the charging circuit 715 to the output terminal 735A, and leaves the voltage converter 710 disconnected from this terminal. In this state the load 740 would likely be replaced with an external source of AC electrical energy for charging the cells 705. When so configured, the external source powers the charging circuit 715 via the switching assembly 720. The charging circuit 715 converts the AC power of the external source into DC power that is used for charging the cells 705.

In the end-of-cycle discharging mode, the switching assembly 720 connects the voltage converter 710 to the charging circuit 715. The switches S1 and S2 are both closed. In some embodiments, the switch S3 is also closed, and the load 740 may be connected to the terminals 735A and 735B. In this mode, the voltage converter 710 steps-up the voltage of the cells 705 and converts this voltage into an alternating voltage. The alternating voltage generated by the converter 710 is sufficient to drive the charging circuit 715. The charging circuit 715 in turn provides DC power to the voltage converter 710. The voltage converter 710 and the charging circuit 715 thus loop into each other in the end-of-cycle discharging mode. Power losses in the two devices are drawn from the cells 705, thereby discharging the cells. The discharging rate may be further increased if the switch S3 is also closed, allowing the power module 701 to dissipate additional energy in the housekeeping power supply 730 and/or the customer load 740.

This document describes in some detail inventive power modules with self-discharge capability, and methods for discharging energy storage cells. This was done for illustration purposes. Neither the specific embodiments of the invention as a whole, nor those of its features limit the general principles underlying the invention. In particular, the invention is not limited to the specific components described or shown in the Figures, or to particular applications. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protections afforded the invention, which function is served by the claims and their equivalents.

I claim:

1. A power module for use with one or more electrical energy storage device comprising:

a voltage converter comprising an input and an output, the input of the voltage converter being coupled to the one or more cells to receive voltage of the one or more cells, the voltage converter being configured to convert the voltage at the input of the voltage converter into a converted voltage at the output of the voltage converter;

a charging circuit comprising an input and an output, the output of the charging circuit being coupled to the one or more energy storage cells and to the input of the voltage converter, the charging circuit being configured to convert electrical voltage at the input of the charging circuit into charging circuit output voltage for charging the one or more cells at the output of the charging circuit; and a switching assembly connected to the input of the charging circuit and to the output of the voltage converter, the switching assembly being capable of selectively coupling the output of the voltage converter to the input of the charging circuit;

wherein, when the switching assembly couples the output of the voltage converter to the input of the charging circuit, the power losses in the voltage converter and in the charging circuit dissipate energy in the one or more cells.

2. A power module in accordance with claim 1, wherein the one or more cells comprise at least one double layer capacitor.

3. A power module in accordance with claim 2, wherein the switching assembly comprises a plurality of solid-state switches.

4. A power module in accordance with claim 2, wherein the voltage converter comprises a DC-to-DC voltage booster.

5. A power module in accordance with claim 2, further comprising a housekeeping power supply coupled to the output of the DC-to-DC voltage booster.

6. A power module in accordance with claim 4, wherein the charging circuit comprises a DC-to-DC constant power circuit capable of increasing current at the output of the charging circuit in response to decrease of voltage of the one or more cells.

7. A power module in accordance with claim 2, wherein the voltage converter comprises a DC-to-DC voltage converter with interleaved operation.

8. A power module in accordance with claim 2, wherein the charging circuit comprises a DC-to-DC constant power circuit with interleaved operation.

9. A power module in accordance with claim 2, wherein:

the charging circuit comprises an AC-to-DC charging voltage converter; and the voltage converter comprises a DC-to-AC voltage booster.

10. A power module in accordance with claim 2, further comprising a switch controller coupled to the switching assembly for controlling state of the switching assembly.

11. A power module in accordance with claim 2, wherein the switching assembly comprises a distributed mechanism that selectively enables and disables the voltage booster and the charger.

12. A system comprising:

one or more energy dissipation loop circuit coupled to one or more energy storage capacitor to actively dissipate energy stored in the one or more energy storage capacitor, wherein the one or more energy dissipation circuit comprises a voltage converter, a charging, circuit, and a switching assembly for selectively coupling the output of the voltage converter to the input of the charging circuit power, and wherein losses in the voltage converter and in the charging circuit can be used dissipate the energy in the one or more energy storage capacitor.

13. The system of claim 12, wherein and the one or more energy dissipation circuit is coupled to a load, and wherein the energy dissipation circuit dissipates the energy such that a voltage at the load is lowered to a safe level environmental level.

14. The system of claim 13, wherein the safe level is a voltage that is less than about 1 volt.

15. The system of claim 12, wherein when the one or more energy storage capacitor comprises one or more 48 volt 400 Farad double-layer capacitor, the one or more energy dissipation circuit can discharge the one or more double-layer capacitor to a safe level in less than one hour.

* * * * *